United States Patent [19]

Trivedi

[11] 3,804,691

[45] Apr. 16, 1974

[54] METHOD OF BONDING USING AN INFRARED HEATING LAMP

[75] Inventor: Mayukh Trigunshankar Trivedi, East Windsor Township, Mercer County, N.J.

[73] Assignee: Western Electric Company, Incorporated, New York, N.Y.

[22] Filed: May 12, 1972

[21] Appl. No.: 252,734

[52] U.S. Cl. .................. 156/272, 219/243, 219/354

[51] Int. Cl. .............................................. B29c 27/02

[58] Field of Search ............ 156/272, 380; 219/216, 219/243, 354, 85

[56] References Cited

UNITED STATES PATENTS

| | | | |
|---|---|---|---|
| 3,509,317 | 4/1970 | Valsamakis | 219/347 |
| 2,808,777 | 10/1957 | Roshkind | 156/272 |
| 3,529,117 | 9/1970 | Costello | 219/347 |
| 2,958,367 | 11/1960 | Gournelle | 156/380 |
| 3,189,702 | 6/1965 | Wall et al. | 156/272 |

*Primary Examiner*—Douglas J. Drummond
*Attorney, Agent, or Firm*—E. W. Pfeifle; A. S. Rosen

[57] ABSTRACT

An infrared heating lamp has a first portion of its envelope coated with a very thin layer of a material which is highly absorptive of infrared radiant energy. A second portion of the envelope, preferably the rest of the envelope surface, is coated with a material which is highly reflective of infrared radiant energy. The lamp is engaged with one or more first workpieces which are to be bonded to one or more second workpieces such that the absorptive material contacts each engaged workpiece in the vicinity of a desired bonding area. Force on the lamp clamps the workpieces together against a base, while maintaining the coating of the absorptive material in intimate contact with the engaged workpieces at the desired bonding areas. Energization of the lamp, meanwhile, applies sufficient thermal energy to the desired bonding areas through the absorptive coating to cause bonding of the workpieces, e.g., reflow solder bonding. The reflective coating enhances the efficiency of the lamp, while protecting any heat-sensitive workpiece areas adjacent to the desired bonding areas from application of excessive thermal energy. A convection shield may surround the envelope, spaced from the envelope, to minimize convection losses from the lamp.

10 Claims, 3 Drawing Figures

PATENTED APR 16 1974 3,804,691

METHOD OF BONDING USING AN INFRARED HEATING LAMP

BACKGROUND OF THE INVENTION

This invention relates to methods and apparatus for bonding workpieces and, more particularly, to methods and apparatus for bonding workpieces by application of thermal energy from a source of infrared radiant energy to one or more desired workpiece bonding areas.

In the art of bonding workpieces, such as in bonding leads or terminals to printed circuits, it is often necessary that bonding take place along an extended zone, which zone may include one or more desired bonding areas. For example, one may wish to bond any number of leads or other first workpieces to spaced locations on a common second workpiece. In order to accomplish such bonding operations efficiently and economically, it is most advantageous that bonding take place simultaneously at all of the desired bonding areas.

One known method of bonding workpieces along an extended zone, at one or more desired bonding areas, is reflow soldering. This method involves precoating at least one workpiece at each desired bonding area with solder. By heating the solder to above its melting point with the workpieces held in engagement with one another at the desired bonding areas, and then allowing the solder to cool and resolidify, strong, reliable solder bonds are formed. This reflow soldering method is considered advantageous, in contradistinction to a number of other forms of bonding, e.g., thermocompression bonding, in that there is no danger of an application of excessive compressive forces, such as might damage the workpieces.

A number of techniques for reheating the solder are known. Each technique has certain disadvantages. For example, convective heating by application of hot air to one or more workpieces in the vicinity of the desired bonding area or areas is relatively inefficient, and risks overheating and, thus, damaging adjacent, heat-sensitive workpiece areas. Liquid immersion heating, further, may require burdensome post-cleaning operations. Electrical resistance heating risks damage to some components which cannot be exposed to high electrical potentials and is not considered well adapted to heat extended zones with a high degree of uniformity. Induction heating heats all metal parts of a workpiece, i.e., those parts which are not to be bonded as well as the desired bonding areas.

A preferred, more readily controllable method for reheating the solder in reflow soldering operations involves the focusing of infrared radiant energy onto one or more workpieces adjacent to the desired bonding area or areas. One limitation of infrared heating, however, involves the fact that the workpieces to be bonded are often composed wholly or partially of materials which are highly reflective of radiant energy, e.g., copper. This tends to render infrared heating inefficient, if not functionally inoperative, for certain reflow soldering applications.

A technique which has been devised for overcoming the high reflectivity limitation in infrared reflow soldering employs low thermal inertia contact members. Each workpiece to be heated is engaged adjacent to the desired bonding area or areas by a very thin contact member composed of a material which is highly absorptive of infrared radiant energy. The material is also a good thermal conductor and is, preferably, nonwettable by molten solder. Workpiece areas not to be heated, and especially heat-sensitive workpiece areas, are not engaged by such contact members. Infrared heating, thus, rapidly and efficiently transmits thermal energy to the workpiece areas engaged by the low thermal inertia contact members, and only to the engaged workpiece areas. This selective heating provides an effective technique for reflow soldering operations.

Separate infrared energy generating lamps, infrared radiation transmitting systems and low thermal inertia contact member assemblies have been employed in known infrared reflow soldering apparatus of the type described. The prior art apparatus, while efficient in performing selective bonding operations, is believed unduly complex, massive and expensive. Simpler, smaller, less costly apparatus for bonding workpieces is considered advantageous. Such simpler and smaller apparatus, and methods for workpiece bonding utilizing the apparatus, would be particularly useful in field operations, where complex, massive equipment cannot practically be employed.

SUMMARY OF THE INVENTION

An object of the invention resides in the provision of new and improved methods and apparatus for bonding workpieces, particularly by application of thermal energy from a source of radiant energy to one or more desired workpiece bonding areas.

The invention contemplates the bonding of workpieces through the use of a source of infrared radiant energy and at least one low thermal inertia contact element. Rather than employing these as separate systems and utilizing an intermediate radiant energy transmission system, however, as has been done in the prior art, the source and low thermal inertia contact element or elements instead constitute a single, self-contained thermal bonding tool. The tool simply takes the form of an infrared heating lamp, the envelope of the lamp being coated with a very thin layer of a material which is highly absorptive of infrared radiant energy and is a good thermal conductor. The coating is patterned to correspond to a pattern of desired workpiece bonding areas. The coating, thus, acts as a low thermal inertia contact element.

By engaging the absorptive coating on the lamp envelope with the desired workpiece bonding areas and energizing the lamp, one or more first workpieces may be bonded simultaneously to one or more second workpieces. Moreover, with the workpieces supported on a base, the lamp may be pressed against one or more of the workpieces to clamp the workpieces together in the vicinity of the desired bonding areas and to maintain intimate contact between the absorptive coating and the engaged workpieces during bonding.

Portions of the lamp envelope, other than those coated with the absorptive coating in accordance with the pattern of desired bonding areas, are preferably coated with a material which is highly reflective of infrared energy. The reflective coating prevents excessive thermal energy from impinging on any heat-sensitive areas of the workpieces which may be located adjacent to the desired bonding areas. Moreover, by reflecting back into the lamp, e.g., toward a lamp filament, all radiant energy not directed toward the desired bonding areas, the reflective coating helps to conserve the energy of the lamp and, thus, renders the operation of the lamp more efficient. It is preferred, therefore, that the reflective coating cover all portions of the lamp envelope not covered by the absorptive coating. The lamp efficiency may be further enhanced through the use of a convection shield surrounding the envelope, spaced from the envelope, so as to minimize convection losses.

DETAILED DESCRIPTION

Figure 1:
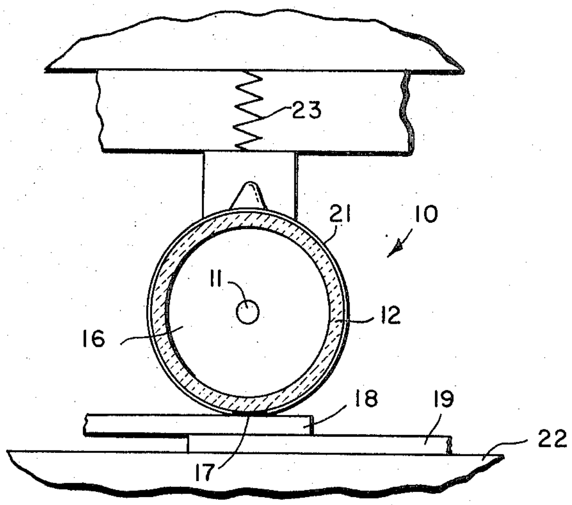
FIG. 1 of the drawing is an end elevational view of an infrared heating lamp bonding two workpieces in accordance with the principles of the invention, the view being taken in section along the line 1—1 in FIG. 2.
Figure 2:
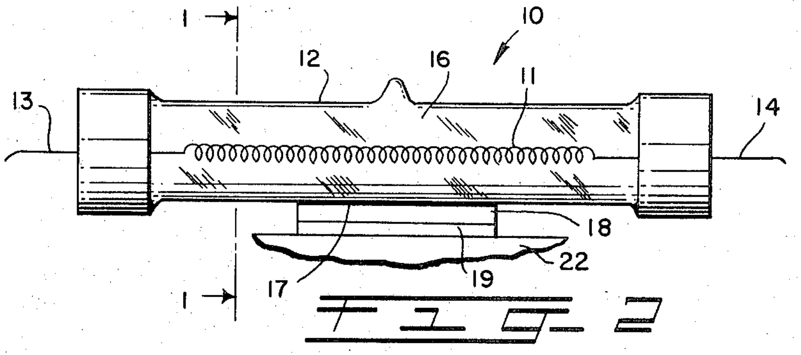
FIG. 2 is a side elevational view of the infrared heating lamp and the workpieces of FIG. 1, further illustrating certain features of the lamp.

Referring to FIGS. 1 and 2 of the drawing, an infrared heating lamp 10 includes a filament 11 and an envelope 12. The filament 11 is adapted to emit infrared radiation, e.g., radiation in the range of from about 0.4$\mu$ to about 3.0$\mu$ wavelength, when energized by an electrical current through a pair of lead wires 13, 14. The envelope 12 may be composed of any material which is transparent to infrared radiation of a wavelength corresponding to that emitted by the energized filament 11. Quartz is preferred as a material for the envelope 12, due to the fact that it is highly transmissive of infrared radiant energy, e.g., having a transmittance of about 95 percent for infrared radiation in the 0.4 to 3.0$\mu$ range. Quartz is also a strong, high temperature resistant substance.

The envelope 12, which has the shape of a generally cylindrical shell, defines a closed surface surrounding a cavity 16. A focal line of the cylindrical shell, along which the filament 11 runs, extends axially through the cavity. The envelope 12 might, alternatively, take the shape of any other convenient closed surface, e.g., a generally spherical shell, surrounding a cavity within which an emitter of infrared radiant energy is located, preferably, at a focus of the closed surface.

A portion of the outer surface of the envelope 12 is covered with a very thin coating of a material 17 which is highly absorptive of infrared radiant energy. The material is also a good thermal conductor, is not subject to significant oxidation at the highest temperature which it is likely to encounter, for example, at temperatures of about 600° to 2,000°F, and is, preferably, notwettable by molten solder. The absorptive coating material 17, which is typically in the form of a film of, for example, approximately 10 to 25$\mu$ depth, may be a commercially available high temperature black or gray, thermally conductive paint, dry film lubricant or antiseize compound, for example, a mixture of graphite, lead, molybdenum sulfide and/or copper solids, suspended in an organic, viscous carrier or solvent, with or without resin, using a toluol and/or xylol diluent. Suitable commercial materials include those marketed by E. I. duPont deNemours & Co. under the trademark "Fel-Pro" and the product number "C300," "C-100," "C-5A," or "C-200." The absorptive coating may be substantially coextensive in shape and dimensions with a desired bonding area for joining two workpieces, e.g., a lead or terminal 18 and a flexible or rigid printed circuit 19. The coating of the absorptive material 17 normally covers a relatively very small portion of the outer surface of the envelope 12.

A major portion of the outer surface of the envelope 12 is coated with a material 21 which is highly reflective of infrared radiant energy. A typical example of a suitable reflective coating material 21 is gold, which may be provided as a film of approximately 5 to 10$\mu$ depth. The coating of the reflective material 21 preferably covers substantially all of the outer surface of the envelope 12 not coated with the absorptive material 17. The reflective material 21 may, alternatively, cover a corresponding area along the inner surface of the envelope.

The operation of the infrared heating lamp 10 of FIGS. 1 and 2 will next be discussed with particular reference to the bonding of two exemplary workpieces 18 and 19, e.g., a lead or terminal and a flexible or rigid printed circuit, along a desired bonding area. It should be noted, however, that the lamp 10 may be utilized to bond a large number of first workpieces, such as leads, simultaneously at numerous desired bonding areas to one or more second workpieces, such as a printed circuit. Plural, discrete coatings of the absorptive material 17 might be spaced at appropriate locations on the outer surface of the envelope 12 where plural first workpieces are to be bonded simultaneously. It should be noted, further, that a lamp of this type is adapted for any heat treating operation in which a high degree of localized heating is required, and not merely to the bonding of workpieces.

In order to bond the two exemplary workpieces 18 and 19, the workpieces are brought into engagement, as by overlapping a portion of the workpiece 18 onto a portion of the workpiece 19. The engaged workpieces are supported on a base 22, while the lamp 10 is contacted with at least one of the workpieces, i.e., the workpiece 18 in the drawing. The contact between the lamp and the workpiece occurs along the coating of the absorptive material 17 on the lamp and along a desired bonding area of the workpiece. The particular order selected for engagement of the respective elements, namely the lamp 10, the workpiece 18, the workpiece 19 and the base 22, is not considered material to the invention.

In order both to clamp the workpieces 18 and 19 together during bonding and to maintain the coating of absorptive material 17 in intimate contact with the workpiece 18 along the desired bonding area, positive pressure is preferably applied to the lamp 10 in the direction of the base 22. A spring 23 may serve as a suitable pressure-applying mechanism.

With the workpieces 18 and 19 held clamped between the lamp 10 and the base 22, the filament 11 is energized by an application of current through the electrical circuit which includes the lead wires 13 and 14. Thus, the filament 11 emits infrared radiant energy at a wavelength which is transmitted by the material of the envelope 12, absorbed by the material 17 and reflected by the material 21. Consequently, a high degree of thermal energy is applied to the coating of the absorptive material 17 and is transmitted by conduction to the desired workpiece bonding area. Since the coating of the absorptive material 17 is quite thin and since it covers only a very small area of the outer surface of the envelope 12, a relatively low thermal inertia characteristic is provided. As a result, the heating of the absorptive material 17 is extremely rapid, as is the transmission of thermal energy to the desired bonding area due to the high thermal conductivity of the absorptive material. Sufficient thermal energy is transmitted to bond the exemplary workpieces 18 and 19 along the desired bonding area, e.g., through reflow solder bonding or other thermal bonding techniques.

The coating of the reflective material 21 on the major portion of the outer surface of the envelope 12 serves two functions. First of all, that part of the infrared radiant energy which would otherwise pass through the transparent envelope 12 and impinge upon areas of the workpieces 18 and 19 other than the desired bonding area is blocked off from such other areas. These other areas are often heat sensitive, to the extent that damage to the workpieces might occur but for the blocking off of radiation by the reflective coating 22. Secondly, this same part of the infrared radiant energy which is not directed toward the desired bonding area and would, thus, be wasted, is reflected back toward the filament 11, thereby serving to enhance the efficiency of the lamp 10 by lessening the required electrical energy input to the filament.

Figure 3:
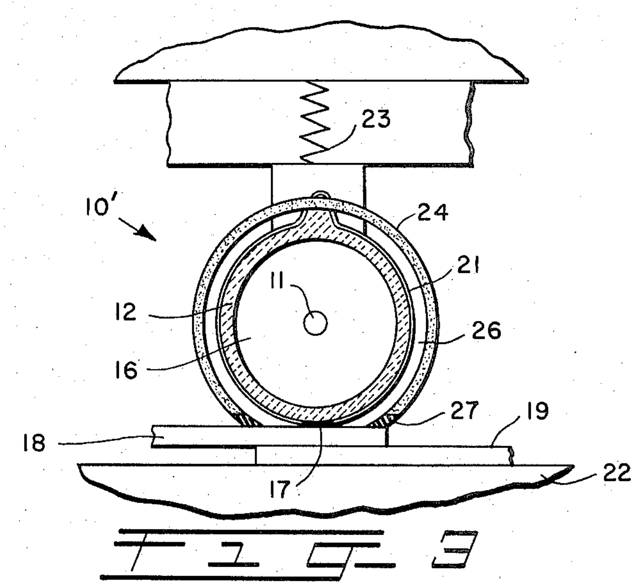
FIG. 3 is an end elevational view, similar to that of FIG. 1, showing an alternative form of infrared heating lamp which incorporates a convection shield.

An alternative embodiment of an infrared heating lamp, lamp 10', is illustrated in FIG. 3. The lamp 10' is generally similar to the lamp 10 and like parts are, thus, numbered identically. To the structure of the lamp 10, however, a convection shield 24 is added. The convection shield 24 is preferably formed of a metal covered with a thick insulation, e.g., mineral wool, of a ceramic, or of any other material which has the property of low thermal conductivity. The convection shield 24 is mounted spaced from the envelope 12 by an air gap 26. The air gap may have a typical radial extent of about 90 mils for a cylindrical lamp envelope of 0.3 inch outer diameter, such gap being less than the boundary layer thickness to prevent natural convection of air between the envelope and the convection shield. The convection shield is interrupted adjacent to the portion of the lamp envelope 12 coated with the absorptive material 17, and is covered with good thermal insulating material 27, such as mineral wool, along the interruption. The interruption, of course, is necessary to permit direct contact between the absorptive material 17 and one or more workpieces, as in the case of the lamp 10.

The lamp 10' of FIG. 3 operates in substantially the same manner as does the lamp 10 of FIGS. 1 and 2. During bonding operations, however, the air gap 26 is completely sealed about the lamp envelope 12 as the insulating material 27 is brought into contact with the surface of at least one of the two exemplary workpieces 18 and 19, e.g., the workpiece 18. The entrapped air in the sealed air gap 26 prevents heat losses from natural convection and eliminates most of the thermal conduction heat loss which might otherwise occur from the lamp envelope 12. The efficiency of the lamp 10' is, thus, enhanced. Meanwhile, the insulating material 27 minimizes any heat transfer between the convection shield 24 and the contacted workpiece 18.

It is to be understood that the described lamps and methods are simply illustrative of lamps and methods employed in accordance with the invention in bonding one or more first workpieces simultaneously to one or more second workpieces. In other embodiments, lamps of various other shapes and/or sizes might be employed in bonding, or otherwise heat treating, any number of articles along desired areas or paths, either linear or curved. It is only necessary that the envelope of each lamp be covered with a coating, preferably a very thin coating, of a material of high infrared radiant energy absorptivity patterned so as to correspond to the desired areas or paths for heat application. Many other modifications may be made without departing from the invention.

What is claimed is:

1. A method of bonding two workpieces, comprising the steps of:

positioning the two workpieces in engagement with one another;

contacting face to face with one of the workpieces a coating directly covering a portion of the outside surface of the envelope of an infrared heating lamp, the coating on the lamp envelope being composed of a material which is highly absorptive of infrared radiant energy; and then applying sufficient thermal energy from the lamp through the highly absorptive coating to bond the workpieces.

2. In the method of claim 1, the two workpieces being supported on a base with the contacted workpiece overlapping the other of the two workpieces, the further step of:

pressing the lamp against the contacted workpiece and toward the base so as to clamp the workpieces together during the application of thermal bonding energy.

3. A method of bonding two workpieces, utilizing an infrared heating lamp comprising an envelope having at least one portion of the outside surface thereof coated with a material which is highly absorptive of infrared radiant energy, and a convection shield surrounding substantially the entire periphery of the lamp envelope except in the vicinity of the highly absorptive material and spaced from the lamp envelope to form an air gap therebetween, the method comprising the steps of:

positioning the two workpieces in engagement with one another;

contacting face to face with one of the workpieces the highly absorptive coating directly covering the at least one portion of the outside surface of the envelope of the infrared heating lamp; and also contacting with one of the workpieces the convection shield for sealing the air gap between the convection shield and the infrared lamp from the surrounding atmosphere; and then applying sufficient thermal energy from the lamp through the highly absorptive coating to bond the workpieces.

4. In the method of claim 3, the two workpieces being supported on a base with the workpiece overlapping, the further step of:

pressing the lamp over the workpieces and toward the base so as to clamp the workpieces together and seal the air gap tightly during the application of thermal bonding energy.

5. A method of bonding two workpieces along a desired bonding area, wherein at least one heat-sensitive workpiece area may be damaged by excessive thermal energy, the method comprising the steps of:

positioning the two workpieces on a base with the workpieces engaging one another along the desired bonding area;

contacting face to face with one of the two workpieces at the desired bonding area a first coating directly covering a portion of the outside surface of the envelope of an infrared heating lamp, the first coating directly contacting the one workpiece substantially coextensively with the desired bonding area and being substantially free of contact with the one workpiece except at the desired bonding area, the first coating on the lamp envelope being composed of a first material which is highly absorptive of infrared radiant energy; while aligning with each heat-sensitive workpiece area a second coating directly covering a second portion of the outside surface of the lamp envelope, the second coating being composed of a second material which is highly reflective of infrared radiant energy; and then applying sufficient thermal energy from the lamp through the first coating to bond the workpieces at the desired bonding area, the second coating protecting each heat-sensitive workpiece area from heat-caused damage.

6. In the method of claim 5, the further step of:

pressing the lamp against the contacted workpiece and toward the base so as to clamp the workpieces together and maintain the first coating and the contacted workpiece in intimate contact at the desired bonding area during the application of thermal bonding energy.

7. A method of bonding a plurality of first workpieces at a plurality of desired bonding areas to at least one second workpiece, comprising the steps of:

positioning the first and second workpieces on a base with the first and second workpieces in engagement at the desired bonding areas;

contacting face to face with one of the workpieces at each desired bonding area a coating directly covering a portion of the outside surface of the envelope of an infrared heating lamp, the direct coating-to-workpiece contact being substantially coextensive with each desired bonding area, the coating on the lamp envelope being composed of a material which is highly absorptive of infrared radiant energy; and then applying sufficient thermal energy from the lamp through the highly absorptive coating to bond the workpieces at the desired bonding area.

8. In the method of claim 7, the further step of:

pressing the lamp against the contacted workpiece at each desired bonding area and toward the base so as to clamp the workpieces together and maintain the highly absorptive coating and the contacted workpiece in intimate contact at each desired bonding area during the application of thermal bonding energy.

9. A method of bonding a plurality of first workpieces at a plurality of bonding areas to at least one second workpiece, wherein at least one heat-sensitive workpiece area may be damaged by excessive thermal energy, the method comprising the steps of:

positioning the first and second workpieces on a base with the first and second workpieces in engagement at the desired bonding areas;

contacting face to face with one of the workpieces at each desired bonding area a first coating directly covering a portion of the outside surface of the envelope of an infrared heating lamp, the direct coating-to-workpiece contact for the first coating being substantially coextensive with each desired bonding area and being substantially absent elsewhere, the first coating on the lamp envelope being composed of a first material which is highly absorptive of infrared radiant energy; while aligning with each heat-sensitive workpiece area a second coating directly covering a second portion of the outside surface of the lamp envelope, the second coating being composed of a second material which is highly reflective of infrared radiant energy; and then applying sufficient thermal energy from the lamp through the first coating to bond the workpieces at the desired bonding areas, the second coating protecting each heat-sensitive workpiece area from heat-caused damage.

10. In the method of claim 9, the further step of:

pressing the lamp against the contacted workpiece at each desired bonding area and toward the base so as to clamp the workpieces together and maintain the first coating and the contacted workpiece in intimate contact at each desired bonding area during the application of thermal bonding energy.

* * * * *